United States Patent [19]
Pellico

[11] Patent Number: 5,817,695
[45] Date of Patent: Oct. 6, 1998

[54] NUTRITIONAL PRODUCT WITH HIGH FAT, LOW CARBOHYDRATE AND AMINO ACID IMBALANCE

[76] Inventor: Michael A. Pellico, 3024 Military Ave., Los Angeles, Calif. 90272

[21] Appl. No.: 997,837

[22] Filed: Dec. 24, 1997

[51] Int. Cl.⁶ .......................... A61K 31/20; A61K 31/195
[52] U.S. Cl. ........................... 514/558; 424/523; 514/23; 514/561; 514/562
[58] Field of Search .................................. 514/561, 562, 514/558, 23

[56] References Cited

U.S. PATENT DOCUMENTS

| | | | |
|---|---|---|---|
| 5,081,105 | 1/1992 | Bristian | 514/2 |
| 5,547,927 | 8/1996 | Cope et al. | 514/2 |
| 5,661,123 | 8/1997 | Stalker et al. | 514/2 |

*Primary Examiner*—Leonard Schenkman
*Attorney, Agent, or Firm*—Donald Diamond

[57] ABSTRACT

A nutritional product is provided for cancer patients comprising, as per caloric requirement, a low concentration of carbohydrate, a high concentration of fat and an imbalance of amino acids wherein L-phenylalanine, L-tyrosine and L-methionine are present in the below normal concentrations and L-leucine is present in substantial excess of normal concentrations to suppress cancer growth and as an adjunct to conventional cancer therapies.

10 Claims, No Drawings

NUTRITIONAL PRODUCT WITH HIGH FAT, LOW CARBOHYDRATE AND AMINO ACID IMBALANCE

FIELD OF THE INVENTION

This invention relates to enteral nutritional products for cancer patients and, more particularly, to enteral nutritional products comprising high fat, low carbohydrate and an elemental amino acid profile having a selected amino acid imbalance for suppressing tumor growth.

BACKGROUND OF THE INVENTION

During the 20th century the average life expectancy for Americans has increased by almost 25 years. The significant gains in lifespan have been largely due to improved preventive health measures and advances in sanitation and nutrition, as well as the treatment of infectious diseases. This prolongation of life expectancy has produced a significant population of aged people with a high incidence of cardiovascular and neoplastic disorders. These disease groups currently account for approximately 70% of the total annual deaths in the United States of America (Committee on Diet, Nutrition, and Cancer, Assembly of Life Sciences, National Research Council: *Diet. Nutrition and Cancer*, Natl. Acad. Press, Washington, D.C., 1982). Consequently, a major part of our health care expenditures and allocations of funds for biomedical research have been directed to the treatment of malignant neoplasms. Despite these efforts, overall, age-adjusted mortality from neoplasms has remained constant, although there have been serious reductions in the mortality from some of its rarer forms, such as Hodgkin' disease, childhood leukemia, and seminomas.

A diverse array of mechanisms can lead to the characteristic alterations implicated in neoplastic transformation. Present research has shown that human neoplasms arise as a direct consequence of an accumulation of genetic alterations involving two main classes of genes: photooncogenies and tumor suppressor genes (Marshall C: Tumor suppressor genes. Cell 64: 313–326, 1991; Bode B, Kaiser H E, Goldfarb R H: Immunophenotypicaly varied cell subpopulations in primary and metastatic human melanomas. Monoclonal antibodies for diagnosis, detection of neoplastic progression and receptor directed immunotherapy. Anticancer Res 16: 517–531, 1996; Bode B, Groger A M, Bode B Jr, Siegel E, Kaiser H E: Immunocytochemical detection of p53 protein overexpression in primary human osteosarcomas. Anticancer Res 17: 493–498, 1997). Oncogenies result from an activating mutatopm generating an enhancement of intracellular protein quantity. Tumor suppressor genes, on the other hand, are commonly inactivated via either mutation or deletion or the physiological function of the gene product is inhibited by binding of inactivating molecules. Observations of the expression of the deleted in colorectal cancer (DCC) gene product, for instance, have demonstrated a significant correlation between DCC protein presence and cellular differentiation and carcinogenesis (Hedrick L, Cho K R, Fearon E R, Wu T-C, Kinzler K W, Vogelstein B: The DCC gene product in cellular differentiation and colorectal tumorigenesis. Genes Dev 8 1174–1183, 1994).

Mutations resulting in an oncogene have been established as dominant genomic alterations, whereas tumor suppressor gene mutations are recessive, requiring loss of function at both alleles for initial neoplastic development. In all cases of neoplastic cell transformation there are three important pre-malignant changes: 1) overexpression of a gene and its product; 2) alteration of a gene product; and 3) inactivation of an encoded protein (Perry M E, Levine A J: Interactions between tumor suppressor gene and oncogene products. Mount Sinai J Med 61: 291–299; Talib V H, Pandey J, Dhupia J S: Molecular markers in cancer diagnosis. Ind J Pathol Microbiol 38: 1–3, 1995; Jacobson D R., Fishman C L, Mills N E: Molecular genetic tumor markers in the early diagnosis and screening of non-small-cell lung cancer. Annals Oncol 6 (Suppl3): S3–S8, 1995; Bugert P, Kovacs G: Molecular differential diagnosis of renal cell carcinomas by microsatellite analysis. Am J Pathol 149: 2081–2088, 19961 Dietzmann K, von Bossanyi P, Sallaba J, Kirches E, Synowitz H J, Warich-Kirches M: Immunohistochemically detectable p53 and mdm-2 oncoprotein expression in astrocytic gliomas and their correlation to cell proliferation. General Diagn Pathol 141: 339–344, 1996).

Neoplastic cells with a highly malignant immunophenotype (IP) are not stable; their genetic alterations can be rapid and dramatic, resulting in cell dedifferentiation and regional tumor heterogeneity (Volpe J P: Genetic instability of cancer: Why a metastatic tumor is unstable and a benign tumor is stable. Cancer Genet Cytogenet 34: 124–134, 1988; Bode B, Zeltzer P M, Saldivar V, Kemshead J: Immunophenotyping of childhood astrocytomas with a library of monoclonal antibodies. Int J Cancer 45: 1079–1087, 1990; Bode B, Bode B Jr, Groger A M, Siegel S E, Kaiser H E: Clinical and prognostic significance of Ki-67 and proliferating cell nuclear antigen expression in childhood primitive neuroectodermal brain tumors. Anticancer Res 17: 189–196, 1997; Bode B, Bode B Jr, Groger A M, Siegel S E, Kaiser H E: Nm23/nucleoside diphosphate (NDP) kinase expression in human malignant melanomas. Significance and implications in tumor biology. Anticancer Res 17: 505–512, 1997).

Nutrition in Neoplastic Transformation and Malignant Disease Progression

During the early years of experimental oncology, daily food intake and various other dietary habits were mentioned among various environmental factors which could initiate and modify tumor formation and progressive growth in laboratory animals (Moreschi C: Beziehungen zwischen Ernahrung und Tumorwachsten. Zeitschr Immunitatsforsch 2: 651–685, 1909; Rous P: The influence of diet on transplanted and spontaneous mouse tumors. J Exp Med 20: 433–451, 1914). More detailed observations exploring the relationship between nutrition and carcinogenesis in various mammals, and animal models of human malignancies have been reported in the past 40 years. During this decade, the era of "Nutritional Oncology" has begun (Ottery F D: Rethinking nutritional support of the cancer patient: the new field of nutritional oncology. Sem Oncol 21: 770–778, 1994). Recently, the National Cancer Institute (NCI) estimates that at least 35% of all human neoplasms are associated with the daily qualitative and quantitative intake of food and the nutritional habits in various countries. As a specific example, women in Japan, consuming the traditional Japanese diet, have a relatively low rate of breast carcinoma (BC). When these and other women immigrate to the U.S.A., their likelihood of developing BC significantly increases. Epidemiological studies in humans have established an association between a high rate of neoplastic transformation and a normal diet high in saturated fat and animal protein (Giuliano A E: A high fiber defense against breast cancer. Los Angeles Times, October 20th issue, 1997). The reason that fat may promote BC is that fat cells represent a major place of estrogen alterations in the human body. Estrogen allows BC cells to grow faster and progressively alter their IP towards a more dedifferentiated (i.e. embryonal) one, and furthermore reduces the efficacy of the cellular immune response in eliminating neoplastically transformed cells of the primary tumor mass and countering the formation of distant metastases. The antioxidants, such as vitamins A, C and E, as well as soybean have been implicated in reducing the likelihood of BC.

The normal development and growth of any multicellular organism requires controlled interactions between cells in the organism. Growth control depends on a variety of signaling mechanisms. The growth of cancer may demonstrate the failure of such control mechanisms.

In a cancer, cell proliferation usually continues independent of a requirement for new cells and differentiation is impaired.

The ability of cancer cells to invade other tissue and to spread by metastasis to other parts of the body where they can generate new tumors is an indication of the malignant nature of a cancer and is the major factor that leads to the death of the host.

Current accepted treatments of tumors usually involves methods of interfering with cell division. The methods most commonly used are hypothermia, radiation, chemotherapy or combinations of them.

Since both radiation and chemotherapy interfere with a cell's ability to divide, rapidly dividing cells such as cancer cells are the most affected.

However, radiation and chemotherapy are not specific against cancer cells. They interfere with any cell in the process of division. Many millions of normal cells are also in the process of division at any period in time. Thus radiation and chemotherapy also inhibit the normal cell division of heathy tissue. This is an especially critical problem for certain organs such as skin, glands, bone marrow, the mucosa and kidneys which have a high rate of cell turnover.

The inability of radiation and chemotherapy to distinguish between abnormal tissue and healthy tissue is an important limiting factor for radiation and chemotherapy. Quite often it is a race patients lose.

Other methods to kill tumor cells are also being used with varying degrees of success. Hypothermia, in which the tumor is heated to temperatures which cause the death of the tumor, is somewhat successful especially in conjunction with radiation and chemotherapy.

Photosensitizing the tumor cell is another treatment which has had some success. However, so far all these methods have had at best partial success due to factors such as toxicity to the patient or the tumor becoming resistant to the treatment.

Knowing the limitations of current treatments, my invention takes a unique approach.

My invention is based on the known metabolic differences between most tumors and healthy cells. In fact my invention also takes advantage of the metabolic differences between a healthy person and a person acting as a host to a cancer.

Cancer cells have different metabolic requirements in at least three major categories.

PROTEINS METABOLISM: In the cancer patient with cachexia the obvious sign of protein deficiency is the loss of skeletal muscle mass. The decreased muscle protein synthesis occurs even in a diet which has adequate amounts of amino acids and calories. Also observed is that some patients with neoplastic diseases, especially leukemia, excrete in their urine novel proteins and peptides.

There is evidence that these proteins are produced by the tumor. Other abnormalities in protein metabolism seem to indicate that the cancer patient cannot undergo metabolic adaptation to decrease food intake. Cancer cells, because of their rapid growth, often require greater amounts of proteins.

CARBOHYDRATE METABOLISM: Repeated clinical and experimental observation shave documented abnormal carbohydrate metabolism in cancer patients. Abnormalities have been noted in peripheral tissue glucose disposal, hepatic glucose production and whole body glucose oxidation and turnover.

Cancer patients as a group have abnormal or diabetic glucose tolerance. The profound alternations observed in carbohydrate metabolism in dogs and humans with cancer result in a net energy gain by the tumor and a net energy loss by the host (Ogilvie, 1989; Ogilvie and Vail, 1990; Vail et al., 1990 b). Glucose is the preferred substrate for energy production in tumor cells. Yet even today TPN treatment (Total Parentenol Nutrition) which is given to the vast majority of cancer patients is a 50% dextrose (glucose) solution! Following is a table from the 1991 publication of Clinical Oncology Textbook of the American Cancer Society.

SUGGESTED DAILY TPN REGIMEN FOR AN ADULT CANCER PATIENT

A. PROTEIN-CALORIE KCAL

| | |
|---|---|
| 700 ml 50% DEXTROSE | 1,190 |
| 400 ml 20% LIPID EMULSION | 880 |
| 1000 ml 10% AMINO ACID SOLUTION | 400 |
| TOTAL CALORIES | 2,470 |
| TOTAL CALORIE:PROTEIN NITROGEN RATIO | 154:1 |
| TOTAL VOLUME | 2,100 ml |
| MULTIVITAMIN PREPARATION | one vial/day |
| VITAMIN K1 | 10 mg/once wk |
| HEPARIN | 8000 u/day |
| GLUTAMIC ACID | 4 g/dad |

B. ADDITIVES

| | | |
|---|---|---|
| ELECTROLYTES | SODIUM CHLORIDE | 60–140 me/day |
| | POTASSIUM CHLORIDE | 60–100 me/day |
| | MAGNESIUM SULFATE | 8–10 me/day |
| | CA; CHI, G;ICPMATE | 9, Eq/day |
| | POTASSIUM PHOSPHATE | 30–45 me/day |
| TRACE MINERALS | COPPER | |
| | ZINC | |
| | MANGANESE | one vial/day |
| | CHROMIUM | |
| | SELENIUM | |
| | IRON | 1 mg/day |

As one can see it has a very high percentage of dextrose, a polymer of glucose. In fact, half the calories of this diet come from sugar.

Studies by Holroyde and Reichard (Carbohydrate metabolism in cancer cachexia; Cancer Treatment Rep. 65:61–65 (1981) have suggested that the increased rate of total glucose turnover seen in cancer patients with weight loss could be accounted for by enhanced Cori cycle activity.

Under normal conditions, the body utilizes glucose through aerobic metabolism via the krebs cycle. Cancer cells possess all the enzymes necessary to carry out aerobic metabolism by the krebs cycle but for obscure reasons, the tumor preferentially metabolizes glucose by anaerobic glycolysis, forming lactate as an end product. The 38 moles of ATP normally formed per mole of glucose in aerobic metabolism is lost; instead only two moles of ATP per mole of glucose are formed during the anaerobic production of lactate. The lactate is then converted back to glucose in the liver by the Cori cycle, resulting in a net loss of four ATP's and two GTP's for every glucose molecule produced.

The tumor ends up gaining energy while the host has a dramatic energy loss. (Ogilvie, Nutrition and Cancer; Veterinary Clinics of North America: Small Animal Practice - Vol. 20, No. 4, 1990).

LIPID METABOLISM: Abnormalities in host lipid metabolism occur during tumor growth in both animals and man. Hyperlipidemia and depletion of lipid stores are the main gross abnormalities resulting from this abnormal fat metabolism. Animal experiments support the findings of enhanced lipid mobilization and decreased lipogenesis by adipose tissue in the tumor-bearing host.

Although many tumors can oxidize fatty acids rapidly, other less well differentiated ones have essentially lost the ability to use them as fuel.

On the basis of these many observations of the metabolic abnormalities of cancer cells, researchers in the past have tried to control cancer growth by dietary manipulation but with very little success.

A report by Mead-Johnson states:

"Five medical investigator groups reported use of diets low in the amino acids, phenylalanine and tyrosine on 23 cancer patients having various melanomas and carcinomas. In 21 of the 23 cases, no improvement in condition was noted during the course of dietary treatment. Only 2 patients showed some improvement in condition, and it is uncertain that dietary management contributed to this in any significant way. This data does not support the use of low phenylalanine/tyrosine diet powder in the management of malignant melanomas and carcinomas." (Mead-Johnson, Products for Dietary Management of Inborn Errors of Metabolism and Other Special Feeding Problems).

Dr. Theologides in Cancer Cachexia; American Cancer Society - Cancer 43:2004–2012, 1979 states "even with forced feeding and total parental hyper alimentation, the process of wasting is only temporarily reversed."

An article by Dr. Dempsey and Dr. Mullen in Cancer, January 1, supplement 1985, states: "Currently there is little compelling data to support the use of specialized amino acid formulae in the malnourished cancer patient with normal liver and kidney function."

Although studies so far have not been able to show that cancers can be controlled by dietary manipulation, there is a large amount of evidence that nutritional support such as TPN (Total Parenteral Nutrition) can cause tumor growth.

"Malnourished animals that undergo nutritional repletion orally (steiger et al. 1975) or with TPN (Daly, Copeland and Dukrick 1978) may have a significant increase in tumor growth" (Clinica Oncology, Holleb, Fink, Murphy 1991). Thus, it is of great concern in the clinical setting that nutritional support may support tumor growth. Yet although TPN has been shown to promote the growth of tumors, the vast majority of cancer patients still receive TPN!

So while special diets have failed to adequately check the growth of tumors, total nutritional support is also not the answer.

My discovery is in understanding how cancer grows and why the prior special diets have failed. My invention is a special diet (formula) that interferes with the cancer's unique nutritional requirements in three major areas, amino acids, fats (lipids) and carbohydrates.

By careful manipulation of the proportions of each group and combining them into one complete diet, I have developed a formula which essentially "starves" a tumor by limiting what it needs for its explosive, uncontrolled growth.

Because a tumor's metabolic requirements are substantially different than normal cells, the host is not harmed by this diet and actually greatly benefits nutritionally.

The prior art discloses nutritional products for use by cancer patients.

U.S. Pat. No. 5,081,105 (Bristian, 1992) discloses, as nutritional support therapy for cancer patients, a parenterally administered diet containing a structural lipid that includes a medium chain fatty acid, and an omega-3 fatty acid to modify tumor growth rate, tumor fractional synthetic rate, and tumor protein breakdown rate.

U.S. Pat. No. 5,547,927 (Cope et al., 1996) discloses, as nutritional support therapy for patients undergoing radiation therapy and/or chemotherapy, an enteral nutritional product containing a soy protein hydrolysate, pea protein, whey protein and a source of fat wherein the ratio, by weight, of the sum of the m-6 fatty acids to the m-3 fatty acids is in the range of about 1.3:1 to 2.5:1.

Also, U.S. Pat. No. 5,661,123 (Stalker et al., 1997) discloses, as nutritional support for malabsorbing patients, an enteral composition that includes a peptide based protein source of hydrolyzed whey, a lipid source, and a carbohydrated source wherein the protein source includes approximately 22% to about 27% of the total calories, and the composition has a caloric density of approximately 1000 Kca/L and a low osmolality of approximately 300 to 450 mOsm/KgH$_2$O.

OBJECTS

An important object of this invention is to provide a new and improved diet for cancer patients through the formulation of an enteral nutritional product with an elemental amino acid profile having a selected amino acid imbalance for suppressing tumor growth.

Another object of this invention is to provide a new and improved diet for cancer patients through the formulation of an enteral nutrition product which is high in fat, low in carbohydrates, and contains an amino acid profile having a selected amino acid imbalance, for suppressing tumor growth.

Upon further study of the specification and claims, additional objects and advantages will become apparent to those skilled in the art.

SUMMARY OF THE INVENTION

In accordance with this invention, there is provided an elemental nutritional product for cancer patients comprising:

(a) carbohydrate in an amount from about 2 to about 15% of the per day total caloric requirement, (b) fat in an amount from about 40 to about 80% of the per day total caloric requirement, and (c) a protein component defined by an amino acid profile to 100% of the per day total caloric requirements, said amino acid profile including L-phenylalanine in an amount from about 0 to about 5 wt. %, L-tyrosine in an amount from about 2 to about 6 wt. %, L-methionine in an amount from about 5 to about 11 wt. %, and L-leucine in an amount from about 20 to about 35 wt. %, with said wt. % being based on the total weight of the amino acid profile.

DETAILED DESCRIPTION

The elemental nutritional products of this invention comprises carbohydrate, fat, and a protein component defined by a pre-selected amino acid profile.

The amino acid profile includes essential and non-essential amino acids wherein L-phenylalanine is present in an amount from about 0 to about 5 wt. % and, preferably, in an amount from about 2 to about 4 wt. %, L-tyrosine is present in an amount from about 2 to about 6 wt. % and, preferably, in an amount from about 3 to about 5 wt. %, L-methionine is present in an amount from about 5 to about 11 wt. % and, preferably, in an amount from about 7 to about 9 wt. %, L-glutamine is present in an amount from about 2 to about 5 wt. %, L-lysine is present in an amount from about 2 to about 6 wt. %, L-leucine is present in an amount from about 20 to about 35 wt. % and, preferably, in an amount from about 24 to about 31 wt. %, and L-arginine HCl is present in an amount from about 20 to about 25 wt. %, with said wt. % being based on the total weight of the amino acid profile.

An important feature of this invention is to limit one or more of the essential amino acids to a small percentage of the needs of the tumor. Although the limitations of non-essential amino acids is not as critical, the diet also includes careful control of and limitations on tyrosine, a non-essential amino acid, because it can be biochemically converted into phenylalanine.

Since a cancer's amino acid requirements exceed those of normal cells, selective reduction in the diet of one or more amino acids can suppress the growth of the cancer. By analogy, an illustrative example can be found in the dietary requirements of phenylalanine for a child and for an adult. The daily child requirements for phenylalanine is 141 mg/kg whereas the daily adult requirement for phenylalanine is only 16 mg/kg. Although this analogy is not perfect, it is apparent that a child and a tumor are rapidly growing and, thus, have a higher level of amino acid requirements than an adult. By careful control of certain amino acids, the diet described herein deprives the tumor of its requirements for both rapid growth and repair.

Carbohydrate is generally present in the nutritional product in an amount from about 2 to about 15% of the total caloric requirement and, preferably, in an amount from about 5 to about 10% of the total caloric requirement.

Many tumors have an enhanced requirement for glucose and are capable of altering the host's ability to utilize glucose so that the tumor is assured of an adequate supply that is necessary for its rapid growth. Thus, the tumor is not just a passive growth, but an active parasite which is forcing the host to feed it. The diet herein is extremely low in carbohydrates to prevent the tumor from using its preferred energy source. This diet allows only enough glucose to enter the blood to ensure that the body receives a barely adequate supply. The tumor is thereby deprived from an essential requirement for growth and repair.

Fat is generally present in the nutritional product in an amount from about 40 to about 80% of the total caloric requirement and, preferably, in an amount from about 50 to about 70% of the total caloric requirement.

Many types of tumors lose their ability to utilize fatty acids as an energy source and, as to those tumors which do not completely lose their ability to utilize lipids, they cannot metabolize lipids with the same ease as they would glucose, which is their preferred energy source. Accordingly, the nutritional product provides most of its calories in the form of lipids, not glucose. Also, the lipids present in the nutritional products are so selected as to be nutritionally useful to the host and less so to the tumor. By reason of these considerations, the nutritional product has a high percentage of fish oils containing omega-3 fatty acids.

In addition, it is important to note that the tumor, an active parasite, can also get its nutritional requirements from the host through biochemical manipulation of the host. The ability of the tumor to derive nutrients from the host causes inanition, weakness, tissue wasting, and organ dysfunction. The term "cancer cachexia" has been adopted to describe these conditions. Thus, regardless of diet, the tumor continues to grow at its own genetically determined rate. However, some studies show that the amino acid L-leucine can block this metabolic pathway of the tumor. Therefore, the nutritional product has a high percentage of L-leucine so as to inhibit the tumor from cannibalizing the host whereby the tumor is forced to grow on a nutritionally incomplete diet and, as a result, the tumor cannot maintain its rapid growth.

EXAMPLES

The following examples further illustrate the invention. The mineral mix and the vitamin mix are the same in each example and, therefore, the ingredient listing for each mix is not repeated after Example 1.

Example 1

| COMPONENT | 5K |
| --- | --- |
| L-ALANINE | 45 gm |
| L-ARGININE HCL | 60.5 gm |
| L-ASPARTIC ACID | 93.5 gm |
| L-CYSTINE | 23 gm |
| L-GLUTAMIC ACID | 339.5 gm |
| GLYCINE | 52 gm |
| L-HISTIDINE HCL | 43 gm |
| L-ISOLEUCINE | 95 gm |
| L-LEUCINE | 145.5 gm |
| L-LYSINE HCL | 118 gm |
| L-METHIONINE | 47.5 gm |
| L-PHENYLALANINE | 2 gm |
| L-PROLINE | 177.5 gm |
| L-SERINE | 91 gm |
| L-THREONINE | 65 gm |
| L-TRYPTOPHAN | 21.5 gm |
| L-TYROSINE | 2.250 gm |
| L-VALINE | 107 gm |
| TAURINE | 10 gm |
| CORN STARCH | 986 gm |
| SUCROSE | 100 gm |
| LARD | 650 gm |
| CORN OIL | 500 gm |
| COD LIVER OIL | 50 gm |
| ALPHACEL NON-NUTRITIVE BULK | 850 gm |
| ETHOXIQUIN | 1.250 gm |
| MINERAL MIX | |
| DICALCIUM PHOSPHATE | 125 gm |
| CALCIUM CARBONATE | 30 gm |
| DIPOTASSIUM PHOSPHATE | 50 gm |
| SODIUM CHLORIDE | 37.5 gm |
| MAGNESIUM SULFATE 7H2O | 30 gm |
| FERRIC CITRATE | |
| COPPER SULFATE 5H2O | 0.250 gm |
| MANGANESE SULPHATE H2O | 0.250 gm |
| ZINC CHLORIDE | 1.100 gm |
| POTASSIUM IODIDE | 0.030 gm |
| SODIUM SELENITE | 0.015 gm |
| AMMONIUM MOLYBDATE | 0.010 gm |
| SODIUM FLUORIDE | 0.030 gm |
| CHROMIUM CHLORIDE 6H2O | 0.065 gm |
| ALUMINUM CHLORIDE | 0.100 gm |
| VITAMIN MIX | |
| VITAMIN A ACETATE (500,000 U/gm) | 0.200 gm |
| VITAMIN D2 (850,000 U/gm) | 0.013 gm |
| VITAMIN E (250 U/gm) | 3 gm |
| MENADIONE | 0.250 gm |
| THIAMINE HCL | 0.110 gm |

| COMPONENT | 5K |
|---|---|
| RIBOFLAVIN | 0.110 gm |
| D CALCIUM PANTOTHENATE | 0.330 gm |
| NIACIN | 0.500 gm |
| PYRIDOXINE HCL | 0.110 gm |
| FOLIC ACID | 0.004 gm |
| BIOTIN | 0.002 gm |
| VITAMIN B-12 (0.1% TRIT) | 0.150 gm |
| CHOLINE CHLORIDE | 25 gm |
| ASCORBIC ACID | 5 gm |
| INOSITOL | 0.550 gm |
| PAB | 0.550 gm |

In this diet the amino acids Tyrosine and Phenylalanine are quite low. The Phenylalanine is only 0.09% of an adults normal requirement. The Tyrosine is only 0.8% of an adult's requirements.

However the Carbohydrate level is somewhat higher than ideal.

Example 2

| COMPONENT | 5K |
|---|---|
| L-ALANINE | 45 gm |
| L-ARGININE HCL | 60.5 gm |
| L-ASPARTIC ACID | 93.5 gm |
| L-CYSTINE | 23 gm |
| L-GLUTAMIC ACID | 339.5 gm |
| GLYCINE | 52.5 gm |
| L-HISTIDINE HCL | 43 gm |
| L-ISOLEUCINE | 95 gm |
| L-LEUCINE | 145.5 gm |
| L-LYSINE HCL | 118 gm |
| L-METHIONINE | 47.5 gm |
| L-PHENYLALANINE | 2 gm |
| L-PROLINE | 177.5 gm |
| L-SERINE | 91 gm |
| L-THREONINE | 65 gm |
| L-TRYPTOPHAN | 21.5 gm |
| L-TYROSINE | 2.250 gm |
| L-VALINE | 107 gm |
| TAURINE | 10 gm |
| CORN STARCH | 100 gm |
| SARDINE OIL | 915 gm |
| LARD | 150 gm |
| CORN OIL | 500 gm |
| COD LIVER OIL | 350 gm |
| ALPHACEL NON-NUTRITIVE BULK | 1,121.0 gm |
| ETHOXIQUIN | 1.250 gm |

In this diet the Phenylalanine and Tyrosine are at the same levels as Example #1.

The Carbohydrate level, however, has been reduced to a low level. There is zero percent sucrose and the cornstarch has been lowered from 197 g/kg of diet to 20 g/kg.

The Carbohydrate calories have been replaced by fat. In this example we are using primarily sardine oil, cod liver oil, corn oil, and a small amount of lard.

Example 3

| COMPONENT | 5K |
|---|---|
| L-ALANINE | 45 gm |
| L-ARGININE HCL | 60.5 gm |
| L-ASPARTIC ACID | 93.5 gm |
| L-CYSTINE | 23 gm |
| L-GLUTAMIC ACID | 339.5 gm |
| GLYCINE | 52.5 gm |
| L-HISTIDINE HCL | 43 gm |
| L-ISOLEUCINE | 95 gm |
| L-LEUCINE | 145.5 gm |
| L-LYSINE HCL | 118 gm |
| L-METHIONINE | 47.5 gm |
| L-PHENYLALANINE | 2 gm |
| L-PROLINE | 177.5 gm |
| L-SERINE | 91 gm |
| L-THREONINE | 65 gm |
| L-TRYPTOPHAN | 21.5 gm |
| L-TYROSINE | 2.250 gm |
| L-VALINE | 107 gm |
| TAURINE | 10 gm |
| CORN STARCH | 100 gm |
| MENHADEN | 915 gm |
| LARD | 150 gm |
| CORN OIL | 500 gm |
| COD LIVER OIL | 350 gm |
| ALPHACEL NON-NUTRITIVE BULK | 1,121.0 gm |
| ETHOXIQUIN | 1.250 gm |

In this diet the formula is the same as Example #2 except that the sardine oil has been replaced by menhaden oil.

Example 4

| COMPONENT | 5K |
|---|---|
| L-ALANINE | 45 gm |
| L-ARGININE HCL | 60.5 gm |
| L-ASPARTIC ACID | 93.5 gm |
| L-CYSTINE | 23 gm |
| L-GLUTAMIC ACID | 339.5 gm |
| GLYCINE | 52.5 gm |
| L-HISTIDINE HCL | 43 gm |
| L-ISOLEUCINE | 95 gm |
| L-LEUCINE | 172 gm |
| L-LYSINE HCL | 118 gm |
| L-METHIONINE | 47.5 gm |
| L-PHENYLALANINE | 2 gm |
| L-PROLINE | 177.5 gm |
| L-SERINE | 91 gm |
| L-THREONINE | 65 gm |
| L-TRYPTOPHAN | 21.5 gm |
| L-TYROSINE | 2.250 gm |
| L-VALINE | 107 gm |
| TAURINE | 10 gm |
| CORN STARCH | 100 gm |
| SARDINE OIL | 915 gm |
| LARD | 150 gm |
| CORN OIL | 500 gm |
| COD LIVER OIL | 350 gm |
| ALPHACEL NON-NUTRITIVE BULK | 1,074.5 gm |
| ETHOXIQUIN | 1.250 gm |

In this diet the amino acids Leucine has been increased to four times its normal amount. A normal adult diet requires approximately 45 mg per kg/day. This diet contains 860 g/kg.

Example 5

| COMPONENT | 5K |
|---|---|
| L-ALANINE | 45 gm |
| L-ARGININE HCL | 150 gm |
| L-ASPARTIC ACID | 93.5 gm |
| L-CYSTINE | 23 gm |

-continued

| COMPONENT | 5K |
|---|---|
| L-GLUTAMIC ACID | 339.5 gm |
| GLYCINE | 52.5 gm |
| L-HISTIDINE HCL | 43 gm |
| L-ISOLEUCINE | 95 gm |
| L-LEUCINE | 145.5 gm |
| L-LYSINE HCL | 118 gm |
| L-METHIONINE | 47.5 gm |
| L-PHENYLALANINE | 2 gm |
| L-PROLINE | 177.5 gm |
| L-SERINE | 91 gm |
| L-THREONINE | 65 gm |
| L-TRYPTOPHAN | 21.5 gm |
| L-TYROSINE | 2.250 gm |
| L-VALINE | 107 gm |
| TAURINE | 10 gm |
| CORN STARCH | 100 gm |
| SARDINE OIL | 915 gm |
| LARD | 150 gm |
| CORN OIL | 500 gm |
| COD LIVER OIL | 350 gm |
| ALPHACEL NON-NUTRITIVE BULK | 1,136.0 gm |
| ETHOXIQUIN | 1.250 gm |

In this example the amino acid Arginine has been increased from 12 g/kg to 30 g/kg.

The amino acids Phenylalanine and Tyrosine are at the levels of Example #1.

Example 6

| COMPONENT | 5K |
|---|---|
| L-ALANINE | 45 gm |
| L-ARGININE HCL | 60.5 gm |
| L-ASPARTIC ACID | 93.5 gm |
| L-CYSTINE | 23 gm |
| L-GLUTAMIC ACID | 600 gm |
| GLYCINE | 52.5 gm |
| L-HISTIDINE HCL | 43 gm |
| L-ISOLEUCINE | 95 gm |
| L-LEUCINE | 145.5 gm |
| L-LYSINE HCL | 118 gm |
| L-METHIONINE | 47.5 gm |
| L-PHENYLALANINE | 2 gm |
| L-PROLINE | 177.5 gm |
| L-SERINE | 91 gm |
| L-THREONINE | 65 gm |
| L-TRYPTOPHAN | 21.5 gm |
| L-TYROSINE | 2.250 gm |
| L-VALINE | 107 gm |
| TAURINE | 10 gm |
| CORN STARCH | 100 gm |
| SARDINE OIL | 915 gm |
| LARD | 150 gm |
| CORN OIL | 500 gm |
| COD LIVER OIL | 350 gm |
| ALPHACEL NON-NUTRITIVE BULK | 1,136.0 gm |
| ETHOXIQUIN | 1.250 gm |

In this example the amino acid L-Glutamine is 1.0 g/kg. This is about 3 times less than normal requirement.

Example 7

| COMPONENT | 5K |
|---|---|
| L-ALANINE | 45 gm |
| L-ARGININE HCL | 60.5 gm |
| L-ASPARTIC ACID | 93.5 gm |

-continued

| COMPONENT | 5K |
|---|---|
| L-CYSTINE | 23 gm |
| L-GLUTAMIC ACID | 339.5 gm |
| GLYCINE | 52.5 gm |
| L-HISTIDINE HCL | 43 gm |
| L-ISOLEUCINE | 95 gm |
| L-LEUCINE | 145.5 gm |
| L-LYSINE HCL | 65 gm |
| L-METHIONINE | 47.5 gm |
| L-PHENYLALANINE | 2 gm |
| L-PROLINE | 177.5 gm |
| L-SERINE | 91 gm |
| L-THREONINE | 65 gm |
| L-TRYPTOPHAN | 21.5 gm |
| L-TYROSINE | 2.250 gm |
| L-VALINE | 107 gm |
| TAURINE | 10 gm |
| CORN STARCH | 100 gm |
| SARDINE OIL | 915 gm |
| LARD | 150 gm |
| CORN OIL | 500 gm |
| COD LIVER OIL | 350 gm |
| ALPHACEL NON-NUTRITIVE BULK | 1,136.0 gm |
| ETHOXIQUIN | 1.250 gm |

In this diet the amino acid L-Lysine is 0.50 g/kg. This is approximately 50 percent of the normal levels.

Example 8

| COMPONENT | 5K |
|---|---|
| L-ALANINE | 45 gm |
| L-ARGININE HCL | 150 gm |
| L-ASPARTIC ACID | 93.5 gm |
| L-CYSTINE | 23 gm |
| L-GLUTAMIC ACID | 600 gm |
| GLYCINE | 52.5 gm |
| L-HISTIDINE HCL | 43 gm |
| L-ISOLEUCINE | 95 gm |
| L-LEUCINE | 145.5 gm |
| L-LYSINE HCL | 118 gm |
| L-METHIONINE | 47.5 gm |
| L-PHENYLALANINE | 2 gm |
| L-PROLINE | 177.5 gm |
| L-SERINE | 91 gm |
| L-THREONINE | 65 gm |
| L-TRYPTOPHAN | 21.5 gm |
| L-TYROSINE | 2.250 gm |
| L-VALINE | 107 gm |
| TAURINE | 10 gm |
| CORN STARCH | 100 gm |
| MENHADEN OIL | 915 gm |
| LARD | 150 gm |
| CORN OIL | 500 gm |
| COD LIVER OIL | 350 gm |
| ALPHACEL NON-NUTRITIVE BULK | 817.5 gm |
| ETHOXIQUIN | 1.250 gm |

In this formula the Carbohydrates have been reduced to a very small percentage. The majority of the calories come from fat and a very small percentage from the proteins. Also, this diet is low in phenylalanine and tyrosine.

One can readily understand that different tumors may require different amino acid combinations.

The diet described herein will be the only source of nutrients for the patient. This diet is a powder which is adapted to be mixed with water and consumed. The diet is based on approximately 1500 calories/day. Since there are 4 calories/gram of diet, the patient will ingest 375 grams of this diet per day. However, the actual amount of the diet will depend on the patient's age, weight and resting metabolism.

A significant factor associated with the diet is the blood levels for phenylalanine and tyrosine. The adult daily requirement for the combination of phenalanine and tyrosine is about 14 mg/kg body weight per day.

It is necessary to carefully control the three major components of the diet. If any one of the components is not strictly controlled, the tumor is given a nutritional escape route.

Also, the concentration of the bulking agent as set forth in the examples can be increased or otherwise adjusted to mask the pungent taste associated with the elemental amino acids and provide a more bland tasting enteral nutritional product.

The diet described herein is particularly adapted for use in conjunction potent therapies including radiation and chemotherapy.

That which is claimed is:

1. An elemental nutritional product for cancer patients comprising:
   (a) carbohydrate in an amount from about 2 to about 25% of the total caloric requirement,
   (b) fat in an amount from about 40 to about 80% of the total caloric requirement, and
   (c) elemental essential and non-essential amino acids to 100% of the total caloric requirement and defining an amino acid imbalance wherein:
      phenylalanine is present in the elemental amino acids in an amount from about 0 to about 5 wt. %,
      L-tyrosine is present in the elemental amino acids in an amount from about 2 to about 6 wt. %,
      L-methionine is present in the elemental amino acids in an amount from about 5 to about 11 wt. %, and
      L-leucine is present in the elemental amino acids in an amount from about 20 to about 35 wt. %.

2. The nutritional product of claim 1 wherein carbohydrate is present in an amount from about 2 to about 15 wt. %.

3. The nutritional product of claim 1 wherein fat is present in an amount from about 60 to about 75 wt. %.

4. The nutritional product of claim 3 wherein the fat source has a significant percentage of omega-3 fatty acids.

5. The nutritional product of claim 1 wherein phenylalanine is present in the elemental amino acids in an amount from about 2 to about 4 wt. %.

6. The nutritional product of claim 1 wherein L-tyrosine is present in the elemental amino acids in an amount from about 3 to about 5 wt. %.

7. The nutritional product of claim 1 wherein L-methionine is present in the elemental amino acids in an amount from about 6 to about 9 wt. %.

8. The nutritional product of claim 1 wherein L-leucine is present in the elemental amino acids in an amount from about 24 to about 30 wt. %.

9. An elemental nutritional product for cancer patients comprising:
   (a) carbohydrate in an amount from about 2 to about 15% of the total caloric requirement,
   (b) fat in an amount from about 60 to about 75% of the total caloric requirement, and
   (c) elemental essential and non-essential amino acids to 100% of the total caloric requirement and defining an amino acid imbalance wherein:
      phenylalanine is present in the elemental amino acids in an amount from about 2 to about 4 wt. %,
      L-tyrosine is present in the elemental amino acids in an amount from about 1 3 to about 5 wt. %,
      L-methionine is present in the elemental amino acids in an amount from about 6 to about 9 wt. %, and
      L-glutamine is present in an 6 amount from about 2 to about 5 wt. %,
      L-lysine is present in an amount from about 2 to about 6 wt. %,
      L-arginine HCl is present in an amount from about 20 to about 25 wt. %, and
      L-leucine is present in the elemental amino acids in an amount from about 24 to about 30 wt. %.

10. The nutritional product of claim 9 wherein the fat source has a significant percentage of omega-3 fatty acids.

* * * * *